United States Patent
Yasuda et al.

(10) Patent No.: US 11,865,965 B2
(45) Date of Patent: Jan. 9, 2024

(54) SYSTEMS AND METHODS FOR ADAPTING HEADLIGHTS WITH COLOR ACCORDING TO SPEED

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US); Guillermo Pita Gil, Redwood City, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 51 days.

(21) Appl. No.: 17/678,249

(22) Filed: Feb. 23, 2022

(65) Prior Publication Data

US 2023/0264624 A1 Aug. 24, 2023

(51) Int. Cl.
*B60Q 1/08* (2006.01)
*F21S 41/663* (2018.01)

(52) U.S. Cl.
CPC ............ *B60Q 1/085* (2013.01); *F21S 41/663* (2018.01); *B60Q 2300/112* (2013.01)

(58) Field of Classification Search
CPC .......................... B60Q 2300/112; B60Q 1/085
See application file for complete search history.

(56) References Cited

U.S. PATENT DOCUMENTS 10,479,269 B2 * 11/2019 Kim ....................... B60Q 1/507
2014/0049973 A1  2/2014 Adachi et al.

FOREIGN PATENT DOCUMENTS

| CN | 206690995 U | 12/2017 |
|---|---|---|
| KR | 19980022754 A | 7/1998 |
| KR | 200160015 Y1 | 11/1999 |
| KR | 19990041965 U | 12/1999 |
| KR | 101748649 B1 | 6/2017 |

OTHER PUBLICATIONS

Peter Kovesi, "Perceptually Uniform Colour Maps," Centre for Exploration Targeting, last accessed on Feb. 15, 2022, 4 pages, found at https://colorcet.com/.
Unknown, "CIELAB color space," last accessed on Feb. 17, 2022, 11 pages, found at https://en.wikipedia.org/wiki/CIELAB_color_space.

* cited by examiner

Primary Examiner — Robert J May
(74) Attorney, Agent, or Firm — Christopher G. Darrow; Darrow Mustafa PC (57) ABSTRACT

System, methods, and other embodiments described herein relate to communicating alerts about a recommended speed by adapting headlight color. In one embodiment, a method includes computing a recommended speed using an automated driving system (ADS) during an operator controlling a vehicle while the ADS is disengaged. The method also includes, responsive to determining that a vehicle speed satisfies a threshold associated with the recommended speed and an offset value set according to a driving environment, adapting an alert color projected by headlights of the vehicle according to the vehicle speed and the alert color is corrected for operator perception of visible colors associated with the driving environment.

20 Claims, 6 Drawing Sheets

$\Delta V = V - V_{Recommended}$

SYSTEMS AND METHODS FOR ADAPTING HEADLIGHTS WITH COLOR ACCORDING TO SPEED

TECHNICAL FIELD

The subject matter described herein relates, in general, to adapting headlights of a vehicle and, more particularly, to adapting headlight color as an alert using a recommended speed.

BACKGROUND

Vehicles equipped with automated driving systems (ADS) can provide an operator with recommendations for maneuvering. The recommendations help the operator understand the environment around the vehicle and avoid hazards. For example, a vehicle operating using shared control, where a control task is shared between the vehicle and the operator, communicates a recommendation (e.g., via haptic feedback) to change lateral position on a steering wheel.

Similarly, an ADS may also communicate a recommendation for longitudinal control. For example, a vehicle can provide feedback on a pedal for an operator to change speeds using a recommendation from the ADS. However, a system using such feedback can startle an operator or provide one-dimensional feedback that limits awareness. In one approach, a vibration on a pedal can confuse and distract an operator, thereby creating unsafe conditions. This type of feedback is also limited to situations where the operator is using a pedal. As such, a system may resort to less effective feedback to communicate the recommended speed. Accordingly, a system providing feedback of a recommended speed can be more comforting, intuitive, and universally applicable.

SUMMARY

In one embodiment, example systems and methods relate to a manner of alerting an operator about a recommended speed of a vehicle using headlight color adaptively. In various implementations, systems alerting an operator of recommended speed changes by an automated driving system (ADS) communicate insufficient information or cause distractions. For example, a system providing haptic feedback on a brake pedal provides a degree insufficient for a recommended speed change since a foot cannot distinguish vibration differences at certain magnitudes or locations on the brake pedal. Regarding notifications other than haptic feedback, an audible alarm can distract or even startle an operator, thereby impacting safety. Therefore, in one embodiment, an adaptation system changes colors of headlights according to differences between a vehicle speed and a recommended speed by the ADS when exceeding a threshold. In particular, the adaptation system adjusts colors representing alerts to optimize perception by the operator. In one approach, the system adjusts the colors for an operator to understand salient differences within certain speed ranges. For example, optimization involves using a color map that is enhanced or corrected for operator perception of visible colors, particularly during nighttime operation by mitigating reflections to understand relationships between color and recommended speeds. In this way, the adaptation system improves alerting an operator of recommended speed changes by reducing alarm distractions through intuitive visual perception and maintaining focus on the road.

In various implementations, the adaptation system communicates differences in degree between the vehicle speed and the recommended speed using a spectrum between different colors. For example, shades of blue or yellow indicate to the operator a moderate level above a recommended speed. On the other hand, shades of red indicate a high level of the vehicle speed being above a recommended speed. In one approach, the adaptation system uses a color gradient where a colored area of projected light indicates an alert and a more distant uncolored area (e.g., clear or white) operates as normal. Accordingly, the adaptation system uses different coloring schemes for headlights to communicate speed alerts more intuitively with higher clarity and understanding, while providing normal illumination for driving, thereby improving feedback for recommending speed and safety.

In one embodiment, an adaptation system for communicating alerts about a recommended speed by adapting headlight color is disclosed. The adaptation system includes a processor and a memory that stores instructions that when executed by the processor cause the processor to compute a recommended speed using an ADS during the operator controlling a vehicle while the ADS is disengaged. The instructions also include instructions to, responsive to a determination that a vehicle speed satisfies a threshold associated with the recommended speed and an offset value set according to a driving environment, adapt an alert color projected by headlights of the vehicle according to the vehicle speed and the alert color is corrected for operator perception of visible colors associated with the driving environment.

In one embodiment, a non-transitory computer-readable medium for communicating alerts about a recommended speed by adapting headlight color and including instructions that when executed by a processor cause the processor to perform one or more functions is disclosed. The instructions include instructions to compute a recommended speed using an ADS during an operator controlling a vehicle while the ADS is disengaged. The instructions also include instructions to, responsive to a determination that a vehicle speed satisfies a threshold associated with the recommended speed and an offset value set according to a driving environment, adapt an alert color projected by headlights of the vehicle according to the vehicle speed and the alert color is corrected for operator perception of visible colors associated with the driving environment.

In one embodiment, a method for communicating alerts about a recommended speed by adapting headlight color is disclosed. In one embodiment, the method includes computing a recommended speed using an ADS during an operator controlling a vehicle while the ADS is disengaged. The method also includes, responsive to determining that a vehicle speed satisfies a threshold associated with the recommended speed and an offset value set according to a driving environment, adapting an alert color projected by headlights of the vehicle according to the vehicle speed and the alert color is corrected for operator perception of visible colors associated with the driving environment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving alerts about a recommended speed by adapting headlight color are disclosed herein. In various implementations, an automated driving system (ADS) providing recommended speed changes through alerts communicates insufficient information or can cause distractions. For example, an audible alarm representing a speed decrease (e.g., braking) can impact safety by distracting or startling an operator. Furthermore, an operator can misunderstand a system varying haptic feedback on a seat or a brake pedal for a recommended speed change since distinguishing vibration differences at certain magnitudes is difficult. Therefore, in one embodiment, an adaptation system compares a recommended speed by an ADS to a vehicle speed and uses headlights that project a color (e.g., red, green, or blue) when meeting a threshold. The ADS can base the recommended speed on safety factors such as diminished visibility, road geometry (e.g., driving on a curve, driving towards a hill), and operator experience. In this way, the vehicle notifies the recommended speed intuitively while the operator keeps attention on the road and maneuvers without direct ADS control. Furthermore, the adaptation system may use the headlights to project an illuminated area having the color representing an alert and an uncolored area (e.g., clear or white), thereby illuminating the road while providing recommended speeds. In one arrangement, an adaptation system controls a color filter or lens within the headlights electro-mechanically to project the color and the uncolored area according to speed variations relative to the threshold.

In one approach, the adaptation system derives the color representing alerts from a color map corrected for human perception using psychophysical data specific for vehicle operators or the driving environment. For example, a vehicle captures images that the adaptation system uses to adjust the color map by determining the driving environment or operator behavior. The color map is corrected so that a numerical change in magnitude corresponds to a similar operator perceived change of visible colors from the headlight projection. In this way, the adaptation system implements a natural relationship between a metric (e.g., speed disparity) and operator perception of the metric through visible colors for the human eye. Accordingly, the adaptation system communicates a recommended speed by an ADS intuitively using headlight color when a vehicle speed surpasses or reaches a threshold, thereby improving safety and operator recognition of speed changes.

Figure 1:
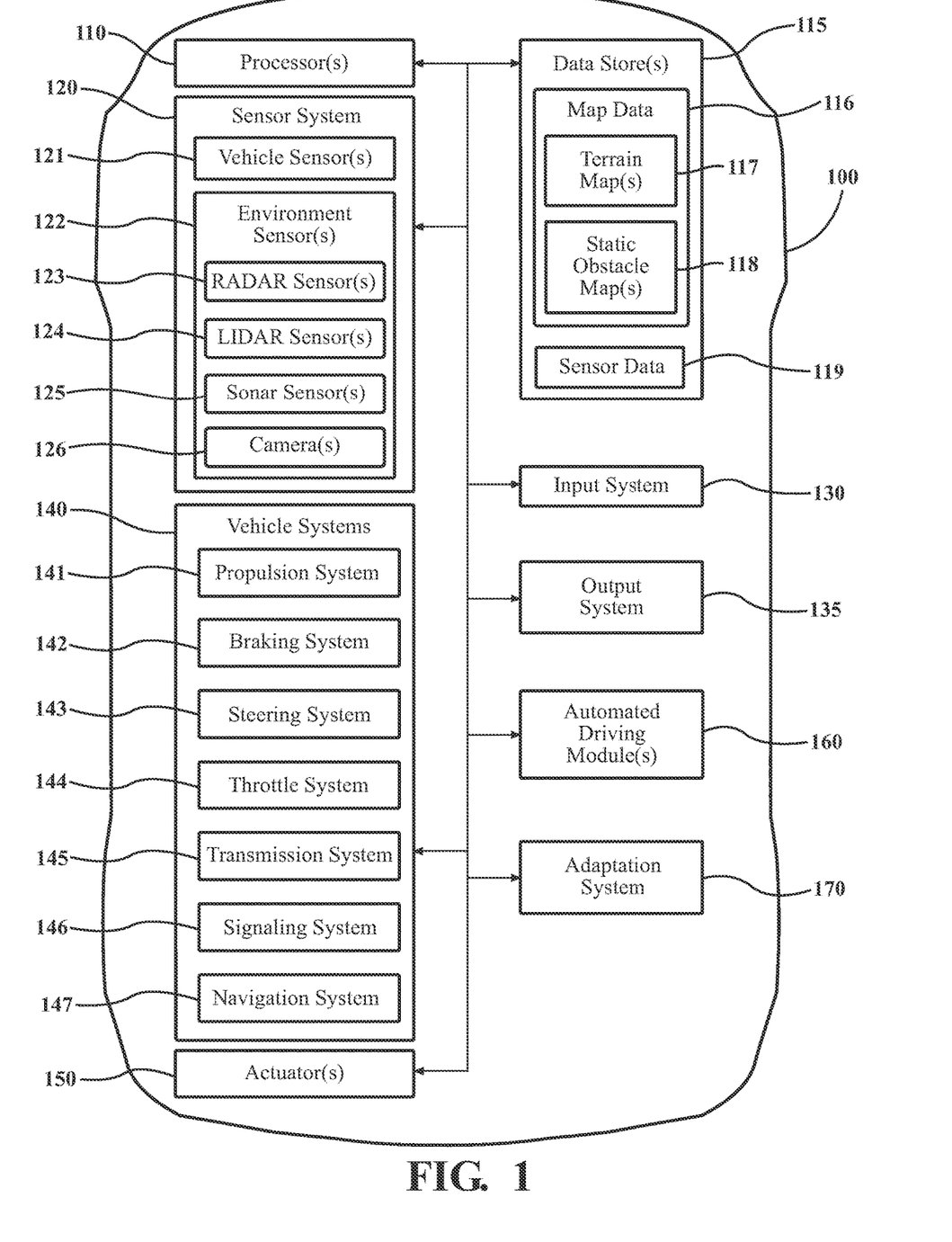
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, an adaptation system uses roadside units (RSU), consumer electronics (CE), mobile devices, robots, drones, and so on in conjunction with improving alerts about a recommended speed by adapting illuminated colors.

Moreover, the vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 is implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an adaptation system 170 that is implemented to perform methods and other functions as disclosed herein relating to improving the communication of a recommended speed by the ADS intuitively and with higher clarity by adapting headlight color, while providing normal illumination for the vehicle 100.

Figure 2:
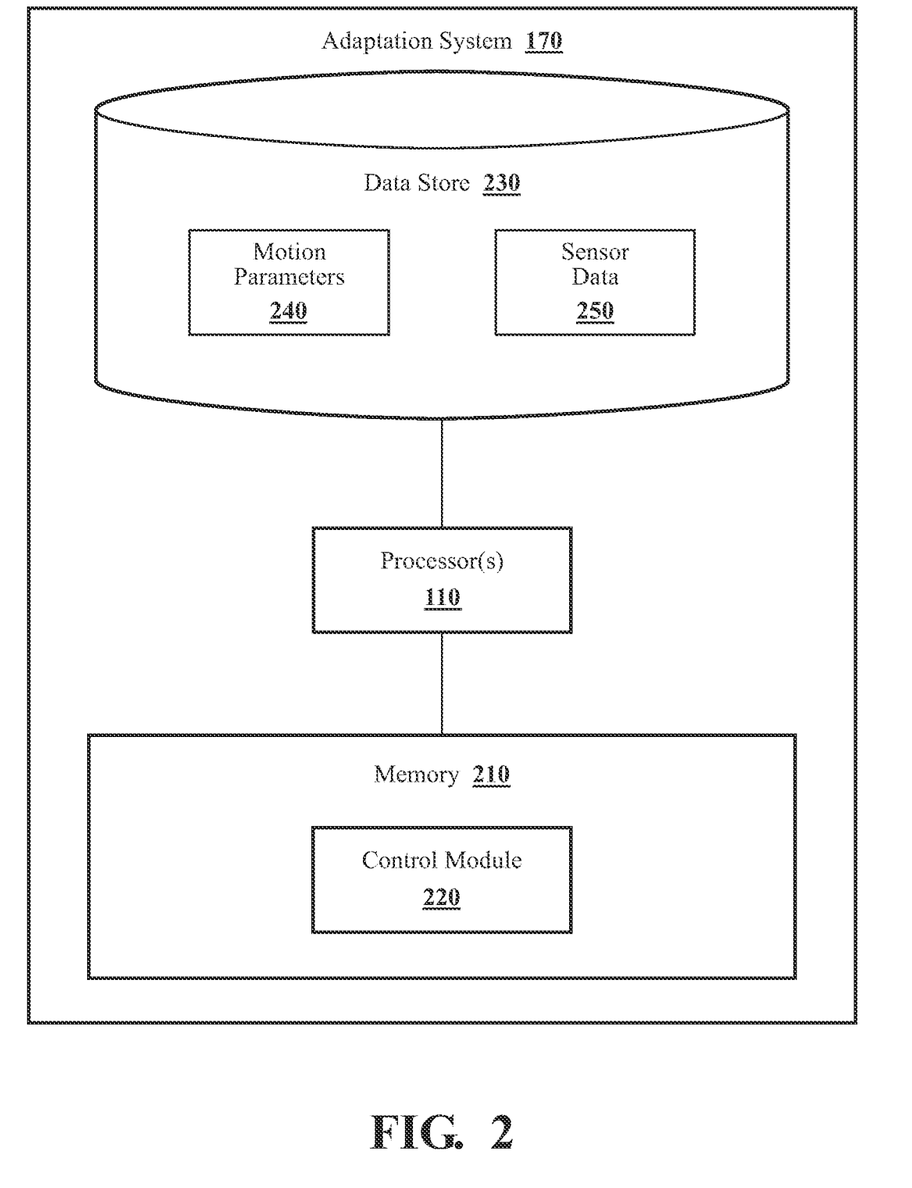
FIG. 2 illustrates one embodiment of an adaptation system that is associated with alerting an operator about a recommended speed of the vehicle using headlight color.

With reference to FIG. 2, one embodiment of the adaptation system 170 of FIG. 1 is further illustrated. The adaptation system 170 is shown as including a processor(s) 110 from the vehicle 100 of FIG. 1. Accordingly, the processor(s) 110 may be a part of the adaptation system 170, the adaptation system 170 may include a separate processor from the processor(s) 110 of the vehicle 100, or the adaptation system 170 may access the processor(s) 110 through a data bus or another communication path. In one embodiment, the adaptation system 170 includes a memory 210 that stores a control module 220. The memory 210 is a random-access memory (RAM), a read-only memory (ROM), a hard-disk drive, a flash memory, or other suitable memory for storing the control module 220. The control module 220 is, for example, computer-readable instructions that when executed by the processor(s) 110 cause the processor(s) 110 to perform the various functions disclosed herein.

The adaptation system 170 as illustrated in FIG. 2 is generally an abstracted form of the adaptation system 170. Furthermore, the control module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the control module 220, in one embodiment, acquires the sensor data 250 that includes at least camera images.

Accordingly, the control module 220, in one embodiment, controls the respective sensors to provide the data inputs in the form of the sensor data 250. Additionally, while the control module 220 is discussed as controlling the various sensors to provide the sensor data 250, in one or more embodiments, the control module 220 can employ other techniques to acquire the sensor data 250 that are either active or passive. Moreover, the control module 220 can undertake various approaches to fuse data from multiple sensors when providing the sensor data 250 and/or from other sensor data acquired over a wireless communication link.

In one embodiment, the adaptation system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the control module 220 in executing various functions. In one embodiment, the data store 230 includes the sensor data 250. In one embodiment, the data store 230 further includes motion parameters 240 such as speed, velocity, acceleration, deceleration, speed vectors, and so on for the vehicle 100. The motion parameters 240 include actual and suggested or recommended values of the vehicle 100. For example, the automated driving module(s) 160, as part of the ADS, determines the suggested or recommended values without altering the motion of the vehicle 100. In this way, a system uses operator inputs to control and maneuver the vehicle 100 while providing useful feedback from the ADS to the operator.

In various implementations, the control module 220 performs additional tasks beyond controlling the respective sensors to acquire and provide the sensor data 250. For example, the control module 220 includes instructions that cause the processor 110 to change the headlight color of the vehicle 100 using feedback from the ADS as a visualization for recommendations about speed. As further explained in FIGS. 3-6, through different colors or color areas controlled by the adaptation system 170, the operator can visually understand and perceive alerts (e.g., speeding or safety).

Figure 3:
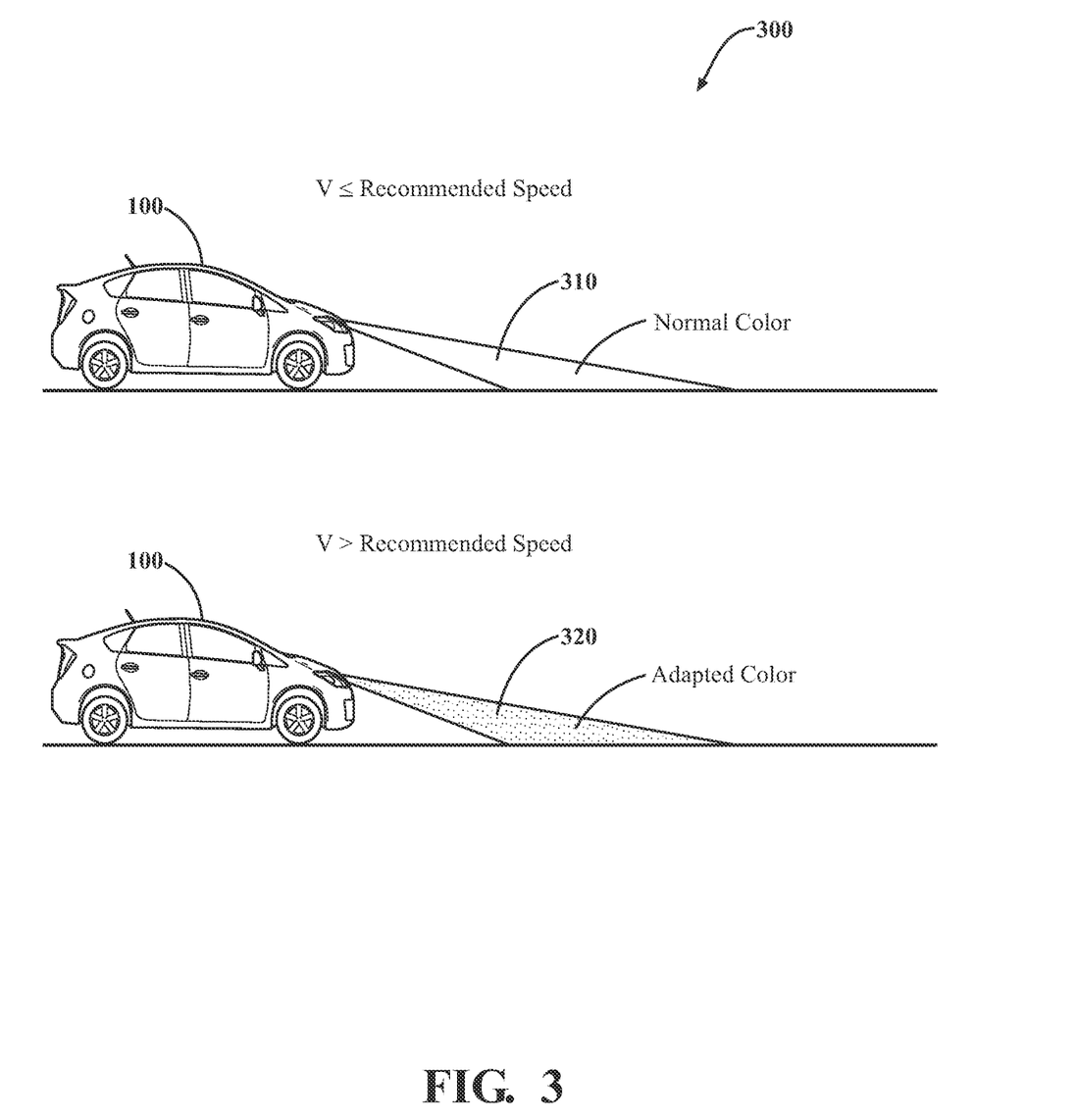
FIG. 3 illustrates one embodiment of the vehicle adapting a headlight color according to the recommended speed and a vehicle speed.

Regarding projecting a color representing an alert or an alert color, FIG. 3 illustrates one embodiment of the vehicle 100 adapting a headlight color according to the recommended speed and a vehicle speed for a scenario 300. Here, the vehicle 100 may be operating using shared control where an operator is involved or in-the-loop for driving maneuvers. In another example, the vehicle 100 operates with limited traded control by the ADS. In any case, the vehicle 100 adapts the headlight color to communicate recommended speeds by the ADS from comparisons to the vehicle speed. For example, the adaptation system 170 projects a normal color 310 for the headlights when the vehicle speed is equal to or below the recommended speed determined by the ADS. Conversely, the adaptation system 170 may project an adapted color 320 when the vehicle speed is above the recommended speed determined by the ADS. As further explained in FIG. 4, the vehicle 100 projects the color change by switching or filtering two light sources (e.g., LEDs) that emit different frequencies. Accordingly, the system causes the operator to perceive recommended speed changes without intervention, thereby decoupling the operator inputs from vehicle control while providing system assistance by a disengaged or engaged ADS.

In one approach, the ADS determines the recommended or suggested speed using safety factors as part of the motion parameters 240. For example, the recommended speed changes according to diminished visibility, road geometry (e.g., driving on a curve, driving towards a hill), and adverse weather conditions (i.e., ice or rain). Also, the recommended speed may change when the environment causes low controllability. In this regard, the adaptation system 170 receives data from the vehicle systems 140 and determines friction degradation on the road surface.

Regarding color perception, the adaptation system 170 may project colors that are directly correlated to speed differences. For instance, a color intensity within a blue or a red range is doubled when the speed difference between the vehicle speed and the recommended speed doubles. In other respects, the adaptation system 170 also enhances the perception of visible color by a human eye using a color map corrected for improved feedback. A color map represents data using a defined distribution (e.g., linear). Depending on value changes and background color, certain ranges (e.g., a red or blue range) of the color map may change too greatly or insufficiently since the color perception of a human is non-linear. These sudden or unintuitive changes can confuse the operator and make perception for ADS feedback through the headlights more difficult. As such, the adaptation system 170 can compensate the color map using psychophysical data specific for vehicle operators or current driving environments, such as according to captured images within the sensor data 250 from a camera, and adjust the color map accordingly. As a result, a given numerical change in magnitude corresponds to a similar operator perceived change in visible color projected by the headlight. In this way, the adaptation system 170 implements a natural relationship between a metric (e.g., speed disparity) and operator perception of the metric through corrections of visible color, thereby improving understanding of recommended speed changes.

Figure 4:
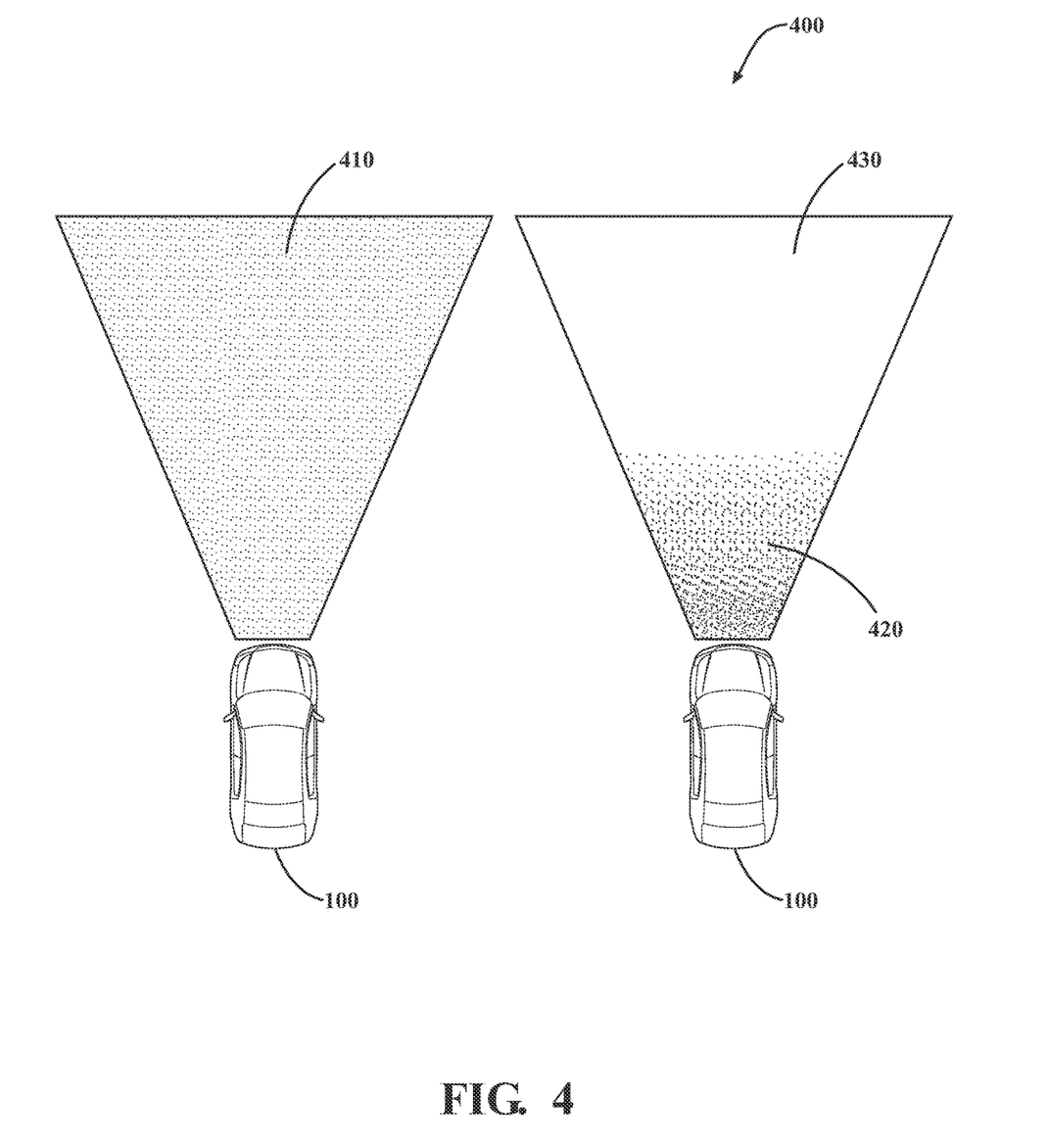
FIG. 4 illustrates an example of the vehicle adapting and varying the headlight color as an alert, including correcting for a color map.

Now considering other color adaptations, FIG. 4 illustrates an example of the vehicle 100 adapting and varying 400 the headlight color as an alert, including correcting for a color map. Here, the adaptation system 170 may control the headlights to project a uniform color area 410 from a color map when the speed difference between a vehicle speed and a recommended speed exceeds a threshold. As explained above, the alert color can be derived from a color map corrected or adjusted for perception. The adaptation system 170 can also use a partial or non-uniform color area 420 to enhance feedback. For example, the non-uniform color area 420 is a gradient with varying magnitudes that indicates a rate between the difference or disparity in speed for the operator as feedback, such as when a threshold level is exceeded. In one approach, the operator perceives the gradient projected by the adaptation system 170 as an alert level for taking action, such as by braking. In addition, the vehicle 100 controls the headlights to project the normal area 430 adjacent to the non-uniform color area 420 that is uncolored (e.g., clear or white). In this way, the adaptation system 170 provides feedback for speed changes while concurrently illuminating an area for normal operation.

In various implementations, the vehicle 100 uses a color filter or a projector system that is electro-mechanically or programmably controllable. For example, a filtered red lighting source (e.g., halogen or LED) projects a gradient source for the non-uniform color area 420, whilst an unfiltered clear or white lighting source projects the normal area 430. In one approach, at least one LED is a base color from the color map corrected or adjusted for enhanced perception and a gradation device filters from an alert color (e.g., red or blue) to a clear or white color. When using an optical projector, the vehicle 100 may use a transparent LED display having alert and non-alert colors (e.g., clear or white) projected by controlling a lens.

Furthermore, the adaptation system 170 may also adapt the headlights according to the driving modes of the vehicle 100. For example, a degree of blue indicates shared control where both the ADS and the operator maneuver the vehicle 100. Here, the ADS is engaged. In this way, the adaptation system 170 helps the operator to perceive and understand a recommended speed change through an alert color and communicates that the vehicle 100 may assist in association with the alert. The operator may also understand that in this state the vehicle 100 can change modes to fully automated for avoiding danger. A degree of color projected by the adaptation system 170 can similarly indicate to control or takeover the vehicle 100 when ADS assistance is insufficient for a driving environment. In addition, in one approach, the ADS uses other human-machine interface (HMI) modalities (e.g., gas pedal or steering wheel) for communicating degrees of an alert color, such as during shared control. In this way, the adaptation system 170 improves intuition of recommended speed changes through multiple modalities.

Figure 5:
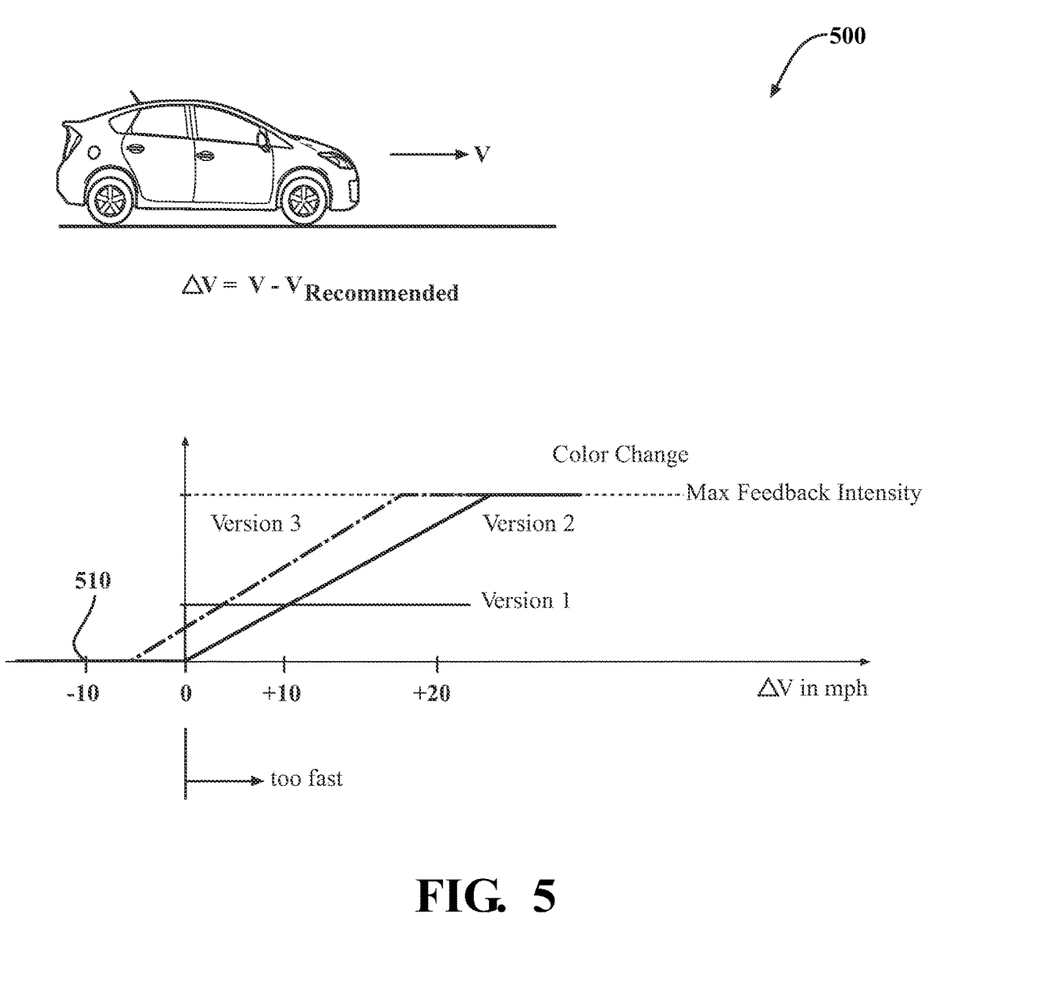
FIG. 5 illustrates an example of the vehicle comparing the vehicle speed to a threshold for the recommended speed and adapting the headlight color.

Turning to FIG. 5, chart 500 illustrates an example of the vehicle 100 comparing the vehicle speed to a threshold for the recommended speed and adapting the headlight color as an alert. As explained above, the color of the headlights can be from a color map that is corrected to enhance perception for speed changes. The chart 500 compares a change of an alert color on the Y-axis and a speed difference $\Delta V$ on the X-axis. Here, the adaptation system 170 computes $\Delta V$ representing the current speed of the vehicle 100 minus the recommended speed by the ADS. Furthermore, the offset 510 may indicate that $\Delta V$ is approaching a threshold for an alert at zero. In this case, the offset 510 is ten but can be any value. For example, the ADS can set the offset value according to the motion parameters 240 according to safety factors or the driving environment.

Moreover, the chart 500 illustrates three Versions 1-3 for using an alert representing a color or an alert color by the adaptation system 170. In Version 1, the vehicle 100 projects a uniform alert color, such as uniform color area 410, at a set intensity when $\Delta V$ is more than zero. The adaptation system 170 may signal a transition to the normal color 310 once $\Delta V$ falls below zero.

In Version 2, the vehicle 100 projects an increasing alert color from a color map up to a critical or maximum feedback intensity when $\Delta V$ is more than zero. Here, in various implementations, the adaptation system 170 can flash headlights, vibrate pedals, or the ADS takes evasive action (e.g., braking or lateral movement) at the critical or maximum feedback level. As such, the additional modalities improve safety and understanding of the recommended speed changes. Once the adaptation system 170 detects that $\Delta V$ is below the maximum feedback intensity, the feedback from the supplemental modalities can be removed while the vehicle maintains the headlight color. The adaptation system 170 may signal a transition to the normal color 310 (e.g., white or clear) once $\Delta V$ falls below zero.

For Version 3, the vehicle 100 projects an increasing alert color from a color map up to the maximum feedback intensity starting at the offset 510 instead of zero. In this way, the operator takes notice of recommended speed changes by the ADS before $\Delta V$ is greater than zero, thereby increasing reaction times. Similar to Version 2, once the adaptation system 170 detects that $\Delta V$ is below the maximum feedback intensity, the feedback from the supplemental modalities (e.g., flashing headlights, vibrating pedals, etc.) can be removed while the vehicle maintains the headlight color. The adaptation system 170 may signal a transition to the normal color 310 (e.g., white or clear) once $\Delta V$ falls below zero or below the offset 510.

Figure 6:
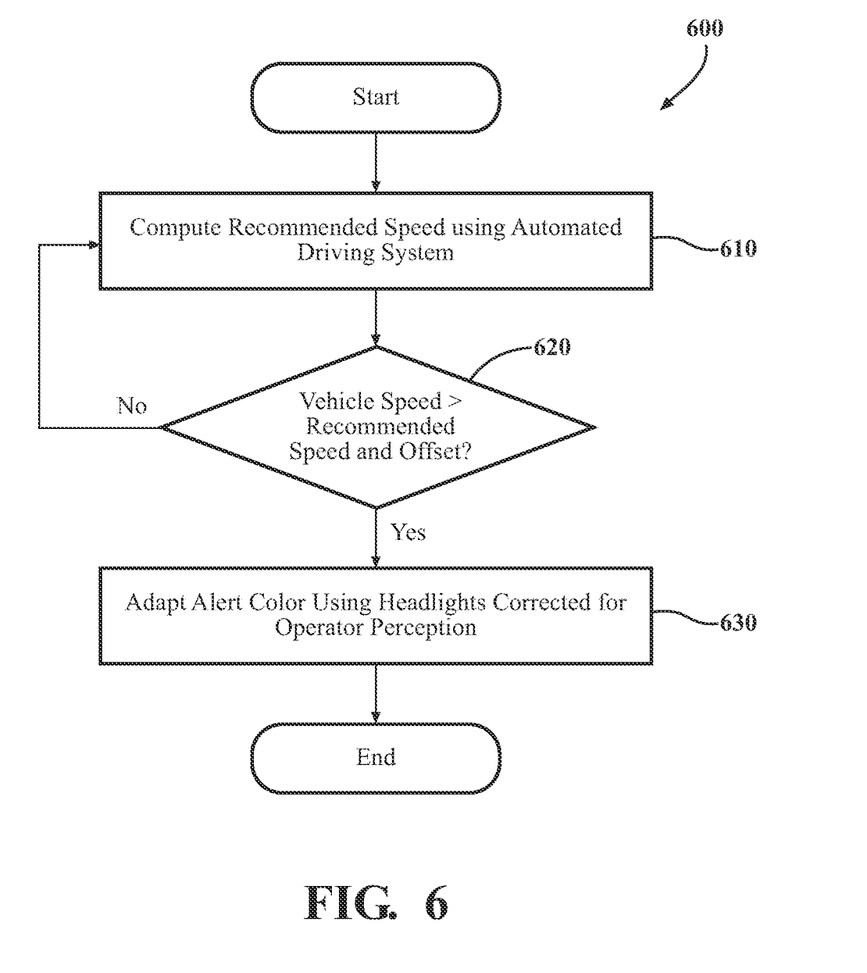
FIG. 6 illustrates one embodiment of a method that is associated with alerting an operator about a recommended speed of the vehicle using the headlight color.

FIG. 6 illustrates a flowchart of a method 600 that is associated with alerting an operator about a recommended speed of the vehicle 100 using headlight color adaptively. In addition, method 600 will be discussed from the perspective of the adaptation system 170 of FIGS. 1 and 2. While method 600 is discussed in combination with the adaptation system 170, it should be appreciated that the method 600 is not limited to being implemented within the adaptation system 170 but is instead one example of a system that may implement the method 600.

At 610, the ADS computes a recommended speed for the vehicle 100. As previously explained, the ADS may compute the recommended or suggested speed using safety factors. For example, the recommended speed changes according to geography (e.g., urban, suburban), diminished visibility, road geometry (e.g., driving on a curve, driving towards a hill), and adverse weather conditions (e.g., ice or rain). Similarly, the recommended speed changes due to operator experience or the environment causing low controllability. In one approach, the ADS computes and combines factors using the sensor data 250, such as images from a vehicle camera or distance measurements from radar.

At 620, the adaptation system 170 determines whether the vehicle speed is greater than a recommended speed and an offset as a threshold. As illustrated in FIG. 5 through Versions 1-3, the offset can be zero or an integer. As previously explained, if the vehicle speed is less than or equal to the threshold, the adaptation system 170 continues to monitor the vehicle 100 and compute the recommended speed using the ADS. As explained herein, the vehicle 100 may project an increasing color from a color map as an alert up to a critical or maximum feedback intensity when the difference between vehicle speed and recommended speed (i.e., $\Delta V$) is more than zero. Here, the adaptation system 170 may also provide supplemental feedback (e.g., flash headlights, vibrate seats) or the ADS takes evasive action (e.g., steering or braking) at the critical or maximum feedback level.

At 630, the adaptation system 170 adapts the alert color using headlights corrected for operator perception when the vehicle speed is greater than a recommended speed and an offset (e.g., 0 or 10). As previously explained, the adaptation system 170 implements a color map having a natural relationship between speed disparity and operation perception. In one approach, psychophysical data specific for vehicle operators or current driving environments, such as according to captured images stored as the sensor data 250 from a camera of the vehicle 100, can correct or enhance a color map for more intuitive perception. For example, a change in magnitude or intensity of a vehicle speed above a recommended speed corresponds to a similar perceived change in headlight color resulting from the corrections.

Moreover, the vehicle may project an alert color before reaching the threshold. In one approach, the threshold is the difference between the vehicle speed and the recommended speed. As shown in Version 3 of FIG. 5, the adaptation system 170 may trigger the alert color starting at the offset 510 so that the operator is notified before ΔV is greater than zero, thereby increasing reaction times. In addition, the alert color may illuminate an area having a non-uniform color area 420 up to a distance that is a gradient indicating a rate between the difference or disparity in speed as feedback. As such, the operator can perceive the gradient projected by the adaptation system 170 as an alert level for taking action, such as by steering or braking. Beyond a distance, the vehicle 100 controls the headlights to project normal area 430 adjacent to the non-uniform color area 420. Accordingly, the adaptation system 170 provides feedback for speed changes while concurrently illuminating an area for normal operation.

In various implementations, the adaptation system 170 and the vehicle 100 can use different mechanisms for producing and projecting the alert color. In one approach, the vehicle 100 uses a color filter and a projector system that is electro-mechanically or programmably controllable. For example, a filtered red lighting source (e.g., halogen or LED) projects a gradient source for the non-uniform area 420, whilst an unfiltered clear or white lighting source projects the normal area 430. In one approach, at least one or an array of LEDs are a base color from the color map corrected or adjusted for enhanced perception and a gradation device filters from an alert color (e.g., red or blue) to clear or white.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the adaptation system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the adaptation system 170, and/or the automated driving module(s) 160 may control some or all of the vehicle systems 140 and, thus, may be partially or fully autonomous as defined by the society of automotive engineers (SAE) levels 0 to 5.

The processor(s) 110, the adaptation system 170, and/or the automated driving module(s) 160 can be operatively connected to communicate with the various vehicle systems 140 and/or individual components thereof. For example, returning to FIG. 1, the processor(s) 110, the adaptation system 170, and/or the automated driving module(s) 160 can be in communication to send and/or receive information from the various vehicle systems 140 to control the movement of the vehicle 100. The processor(s) 110, the adaptation system 170, and/or the automated driving module(s) 160 may control some or all of the vehicle systems 140.

The processor(s) 110, the adaptation system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the adaptation system 170, and/or the automated driving module(s) 160 can control the direction and/or speed of the vehicle 100. The processor(s) 110, the adaptation system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the adaptation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An adaptation system for warning an operator, comprising:
 a processor; and
 a memory storing instructions that, when executed by the processor, cause the processor to:
  compute a recommended speed by an automated driving system (ADS) during the operator controlling a vehicle while the ADS is disengaged and while avoiding intervention by the ADS; and
  responsive to a determination that a vehicle speed satisfies a threshold associated with the recommended speed and an offset value set according to a driving environment, adapt an alert color projected by headlights of the vehicle according to the vehicle speed and the alert color is corrected for operator perception of visible colors associated with the driving environment.

2. The adaptation system of claim 1, wherein the instructions to adapt the alert color further include instructions to adjust the alert color according to a prior maneuver performed by the operator.

3. The adaptation system of claim 2, further including instructions that when executed by the processor cause the processor to:
 project, by the headlights, the alert color within an illuminated area, wherein the alert color includes a colored area projected up to a distance in the illuminated area and an uncolored area beyond the distance in the illuminated area and a degree of the colored area indicates additional information about the driving environment.

4. The adaptation system of claim 3, wherein the colored area is a red color and the uncolored area is a clear color from a color map.

5. The adaptation system of claim 1, wherein the instructions to adapt the alert color further include instructions to adjust the alert color according to a difference between the vehicle speed and the recommended speed and safety of a maneuver.

6. The adaptation system of claim 1, further including instructions that when executed by the processor cause the processor to:
 trigger brakes of the vehicle when a difference between the vehicle speed and the recommended speed reaches a critical level during a shared control of the vehicle when the ADS is engaged; and
 adjust the alert color to indicate the critical level using a color gradient.

7. The adaptation system of claim 1, further including instructions that when executed by the processor cause the processor to:

emit, upon satisfying the threshold, a colored light according to a color map adjusted for the operator perception by lighting sources within the headlights; and display, by controlling the headlights, the alert color by applying one of a color filter and a lens to the colored light.

8. The adaptation system of claim 1, wherein the alert color derives from a non-linear distribution of a color map and the color map is related to perceived differences between the recommended speed and the vehicle speed.

9. The adaptation system of claim 1, wherein the offset value is associated with one of a safety factor and the driving environment.

10. A non-transitory computer-readable medium comprising:

instructions that when executed by a processor cause the processor to:

compute a recommended speed by an automated driving system (ADS) during an operator controlling a vehicle while the ADS is disengaged and while avoiding intervention by the ADS; and responsive to a determination that a vehicle speed satisfies a threshold associated with the recommended speed and an offset value set according to a driving environment, adapt an alert color projected by headlights of the vehicle according to the vehicle speed and the alert color is corrected for operator perception of visible colors associated with the driving environment.

11. The non-transitory computer-readable medium of claim 10, wherein the instructions to adapt the alert color further include instructions to adjust the alert color according to a prior maneuver performed by the operator.

12. A method comprising:

computing a recommended speed by an automated driving system (ADS) during an operator controlling a vehicle while the ADS is disengaged and while avoiding intervention by the ADS; and responsive to determining that a vehicle speed satisfies a threshold associated with the recommended speed and an offset value set according to a driving environment, adapting an alert color projected by headlights of the vehicle according to the vehicle speed and the alert color is corrected for operator perception of visible colors associated with the driving environment.

13. The method of claim 12, wherein adapting the alert color further includes adjusting the alert color according to a prior maneuver performed by the operator.

14. The method of claim 13, further comprising:

projecting, by the headlights, the alert color within an illuminated area, wherein the alert color includes a colored area projected up to a distance in the illuminated area and an uncolored area beyond the distance in the illuminated area and a degree of the colored area indicates additional information about the driving environment.

15. The method of claim 14, wherein the colored area is a red color and the uncolored area is a clear color from a color map.

16. The method of claim 12, wherein adapting the alert color further includes adjusting the alert color according to a difference between the vehicle speed and the recommended speed and safety of a maneuver.

17. The method of claim 12, further comprising:

triggering brakes of the vehicle when a difference between the vehicle speed and the recommended speed reaches a critical level during a shared control of the vehicle when the ADS is engaged; and adjusting the alert color to indicate the critical level using a color gradient.

18. The method of claim 12, further comprising:

emitting, upon satisfying the threshold, a colored light according to a color map adjusted for the operator perception by lighting sources within the headlights; and displaying, by controlling the headlights, the alert color by applying one of a color filter and a lens to the colored light.

19. The method of claim 12, wherein the alert color derives from a non-linear distribution of a color map and the color map is related to perceived differences between the recommended speed and the vehicle speed.

20. The method of claim 12, wherein the offset value is associated with one of a safety factor and the driving environment.

* * * * *